United States Patent
Thyagharajan et al.

(10) Patent No.: US 11,074,706 B2
(45) Date of Patent: Jul. 27, 2021

(54) ACCOMMODATING DEPTH NOISE IN VISUAL SLAM USING MAP-POINT CONSENSUS

(71) Applicant: Intel Corporation, Santa Clara, CA (US)

(72) Inventors: Anirud Thyagharajan, Bengaluru (IN); Om J. Omer, Bengaluru (IN); Dipan Mandal, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 16/383,177

(22) Filed: Apr. 12, 2019

(65) Prior Publication Data

US 2019/0236797 A1 Aug. 1, 2019

(51) Int. Cl.
  *G06T 7/593* (2017.01)
  *G06T 7/80* (2017.01)
  *G06T 7/73* (2017.01)

(52) U.S. Cl.
  CPC .............. *G06T 7/593* (2017.01); *G06T 7/73* (2017.01); *G06T 7/85* (2017.01); *G06T 2200/04* (2013.01); *G06T 2207/10028* (2013.01); *G06T 2207/30244* (2013.01)

(58) Field of Classification Search
  CPC ......... G06T 2207/30244; G06T 19/006; G06T 7/579; G06T 2207/10028; G06T 7/74; G06T 7/70; G06T 17/00; G06T 2207/20081; G06T 7/73; G06T 2207/10016; G06T 2207/20084; G06T 7/20; G06T 19/20; G06T 2200/04; G06T 2207/10048; G06T 2207/30252; G06T 7/246; G06T 17/05; G06T 2207/10021
  USPC ........................................ 382/154
  See application file for complete search history.

(56) References Cited

U.S. PATENT DOCUMENTS

| | | | |
|---|---|---|---|
| 2004/0168148 A1* | 8/2004 | Goncalves | G05D 1/0248 717/104 |
| 2010/0286905 A1* | 11/2010 | Goncalves | G05D 1/0234 701/532 |
| 2018/0075643 A1* | 3/2018 | Sequeira | G01S 17/42 |
| 2019/0219401 A1* | 7/2019 | Daniilidis | G01C 21/18 |

OTHER PUBLICATIONS

Heyden, Anders et al., "Multiple View Geometry", Emerging Topics in Computer Vision, Jun. 11, 2004, pp. 44-106.

(Continued)

*Primary Examiner* — Ajibola A Akinyemi
(74) *Attorney, Agent, or Firm* — Jordan IP Law, LLC

(57) ABSTRACT

An apparatus, method, and computer readable medium to accommodate depth noise in SLAM (Simultaneous Localization & Mapping). The method includes receiving correspondences and clusters for pose estimation. After the correspondences and clusters are received, a dynamic centroid is determined using 3-D features of a landmark. The 3-D features of the landmark comprise a cluster. Next, distance-error metrics are determined using the dynamic centroid, a map point, and the cluster. The distance-error metrics are compared with thresholds to remove depth noise affected 3-D features and landmarks when the distance-error metrics are larger than the thresholds. The remaining 3-D features of the cluster are sent to a pose estimation framework.

25 Claims, 9 Drawing Sheets

(56) References Cited

OTHER PUBLICATIONS

Pirchheim, Christian et al., "Handling Pure Camera Rotation in Keyframe-Based Slam", In Mixed and Augmented Reality (ISMAR), 2013 IEEE International Symposium, 10 pages.
Nguyen, Chuong V. et al., "Modeling Kinect Sensor Noise for Improved 3D Reconstruction and Tracking", In 3D Imaging, Modeling, Processing, Visualization and Transmission (3DIMPVT), 2012 Second International Conference, IEEE, Oct. 13, 2012, pp. 524-530.
Mur-Artal, Raul et al. "Orb-Slam2: An Open-Source Slam System for Monocular, Stereo, and RGB-D Cameras", IEEE Transactions on Robotics 33.5, Jun. 19, 2017, 8 pages.
Cvisic Igor et al. "Soft-SLAM: Computationally Efficient Stereo Visual SLAM for Autonomous UAVS", Journal of Field Robotics, 2017, 37 pages.
Engel, Jakob et al., "LSD-SLAM: Large-Scale Direct Monocular SLAM", European Conference on Computer Vision, 2014, 16 pages.
Engel, Jakob et al., "Direct Sparse Odometry", IEEE Transactions on Pattern Analysis and Machine Intelligence 40.3, Oct. 7, 2016, 17 pages.
Whelan, Thomas et al. "Kintinuous: Spatially Extended KinectFusion", RSS Workshop on RGB-D: Advanced Reasoning with Depth Cameras, Jul. 2012, 8 pages.
Kerl, Christian et al., "Dense Continuous-Time Tracking and Mapping with Rolling Shutter RGB-D Cameras", Proceedings of the IEEE International Conference on Computer Vision, Dec. 2015, pp. 2264-2272.
Burri, Michael et al. "The EuRoC MAV Datasets", The International Journal of Robotics Research 35.10, Jan. 29, 2016, 9 pages.
Sturm, Jurgen et al. "A Benchmark for the Evaluation of RGB-D SLAM Systems", Intelligent Robots and Systems (IROS), 2012 IEEE/RSJ International Conference on. IEEE, Oct. 2012, 8 pages.
Jones, Eagle S. et al., "Visual-Inertial Navigation, Mapping and Localization: A Scalable Real-Time Causal Approach", The International Journal of Robotics Research 30.04, Jan. 17, 2011. 38 pages.
Rosten, Edward et al., "Machine learning for high-speed corner detection", Department of Engineering, Cambrige University, UK, 2006. 14 pages.
Calonder, Michael et al., "BRIEF: Binary Robust Independent Elementary Features", CVLab, EPFL, Lausanne, Switzerland, 2010. 14 pages.
Rublee, Ethan et al., "ORB: an efficient alternative to SIFT or SURF", IEEE International Conference on Computer Vision, Nov. 2011. 9 pages.

\* cited by examiner

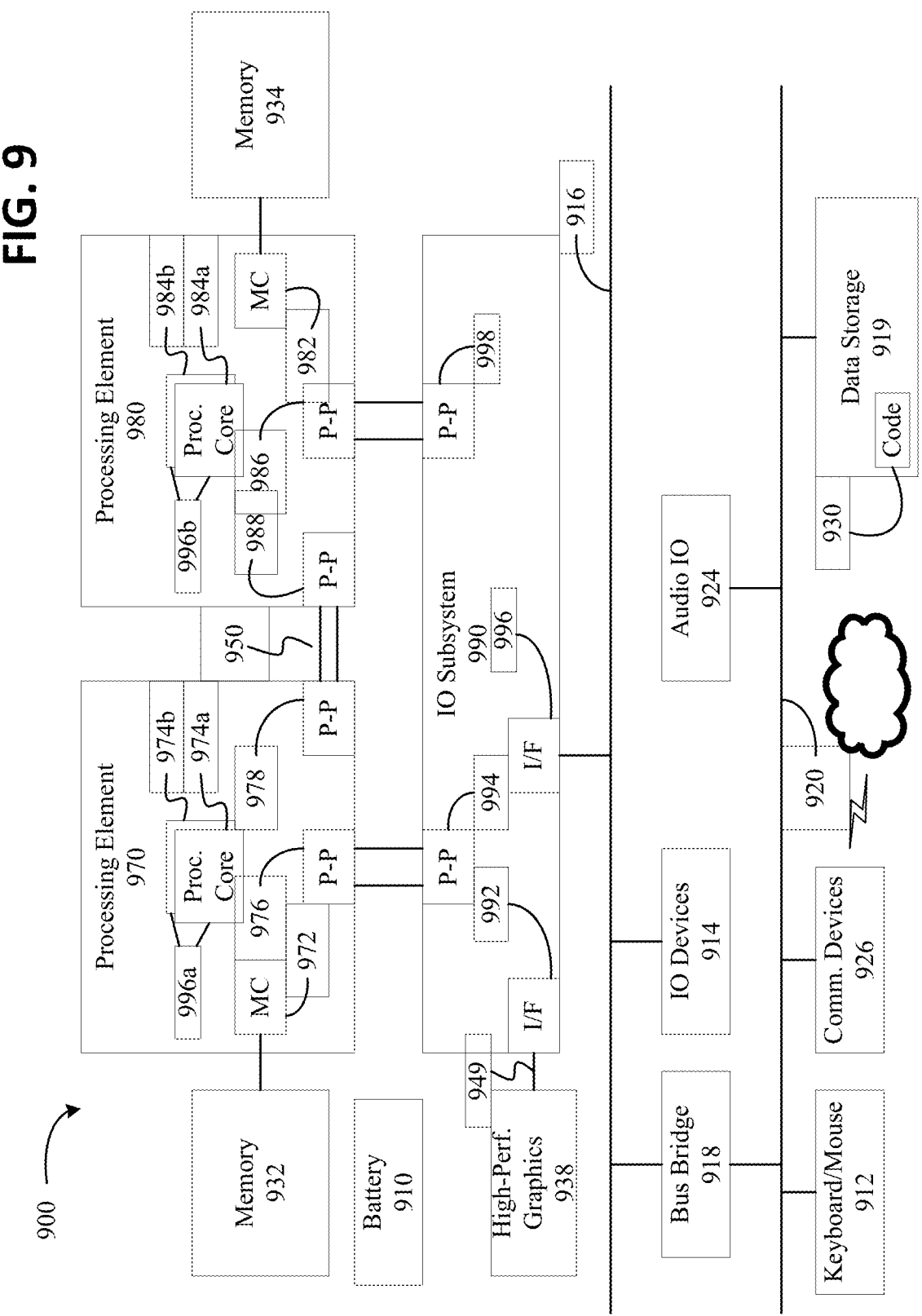

ACCOMMODATING DEPTH NOISE IN VISUAL SLAM USING MAP-POINT CONSENSUS

TECHNICAL FIELD

Embodiments generally relate to Simultaneous Localization & Mapping (SLAM). More particularly, embodiments relate to accommodating depth noise in visual SLAM using map-point consensus.

BACKGROUND

SLAM (Simultaneous Localization & Mapping) is a process for placing an agent in an unknown location of an unknown environment to build a map of its surroundings and localizing sensor(s) in the map. While building the map of its surroundings, the agent must also simultaneously determine its location within the map. This is a fundamental problem in robotics, Augmented and Virtual Reality (AR-VR) applications, automated navigation systems and other such applications. Visual Odometry (VO) is one of the most widely used techniques for SLAM as visual sensors are cost-effective and rich in information as compared to other sensor modalities.

Feature-based Stereo and RGB-D (Red, Green & Blue-Depth) SLAM frameworks using cameras as agents may commence by detecting interest points in a captured image of landmarks within the surrounding environment. The interest points are interesting points in the surroundings that carry discriminative features or attributes that may be used for tracking. The interest points are referred to as features. These features are back-projected into 3-D space using their depth observations (3-D feature points). These features are matched across multiple view-points to build correspondences. Camera poses along with map-points (estimated location of landmark) are jointly optimized by minimizing a projective error (between 3D feature and map-point) through an optimization process, such as, for example, bundle adjustment.

Inferring depth for detected feature points is important for VO based SLAM, as monocular vision is prone to suffer from scale and initialization issues. Since depth sensing is missing in visual cameras, it is often inferred through techniques such as active stereo (structured light), passive stereo (calibrated stereo cameras) or through other sensor modalities, such as, for example, radar, infrared, IMUs, etc. These techniques suffer from accuracy issues. Apart from the unavailability of a depth map in certain regions (i.e., holes), there are two categories of inaccuracies which are prevalent in depth maps. The first category is axial noise or error in depth along the depth axis (the line between the camera and the pixel in projection plane. The second category is lateral noise or depth of the current pixel being influenced or carried over from neighborhood pixels. Most of the SLAM approaches use joint optimization techniques over detected/tracked features and the estimated poses of camera viewpoints, minimizing the projective error between the observed and estimated locations of landmarks in the 3-D world coordinate. This often helps in overcoming axial depth inaccuracies, however results show that the lateral noise badly impacts these de techniques as feature correspondences may be completely lost. In scenarios where a large set of feature points fall on depth boundaries, the impact may be even higher because lateral noise is more prevalent on edges.

Solutions to VO/SLAM, such as, for example, ORB-SLAM (Oriented FAST (Features from Accelerated Segment Test) and Rotated BRIEF (Binary Robust Independent Elementary Features)-SLAM (Simultaneous Localization and Mapping)), DSO (Direct Sparse Odometry), LSD-SLAM (Large-Scale Direct Monocular-SLAM), Soft-SLAM (Stereo Odometry Feature Tracking-SLAM), Sensor-Fusion (by Intel Corporation), etc. implement techniques to assess the fidelity of pose estimation and take actions, such as, for example, dropping particular frames, re-estimation using global cues, etc. These actions lack pre-filtering of features for which tracking is inconsistent with ground-truth pose ahead of the optimization routine. Outlier detection is either a part of or at the end of the optimization routine, thereby causing the estimated pose to be affected by outliers. In other words, in some scenarios, bad features may get annotated as inliers and good features may be discarded as outliers.

BRIEF DESCRIPTION OF THE DRAWINGS

The various advantages of the embodiments will become apparent to one skilled in the art by reading the following specification and appended claims, and by referencing the following drawings, in which:

FIG. 9 is a block diagram of an exemplary computing system according to an embodiment.

Figure 1:
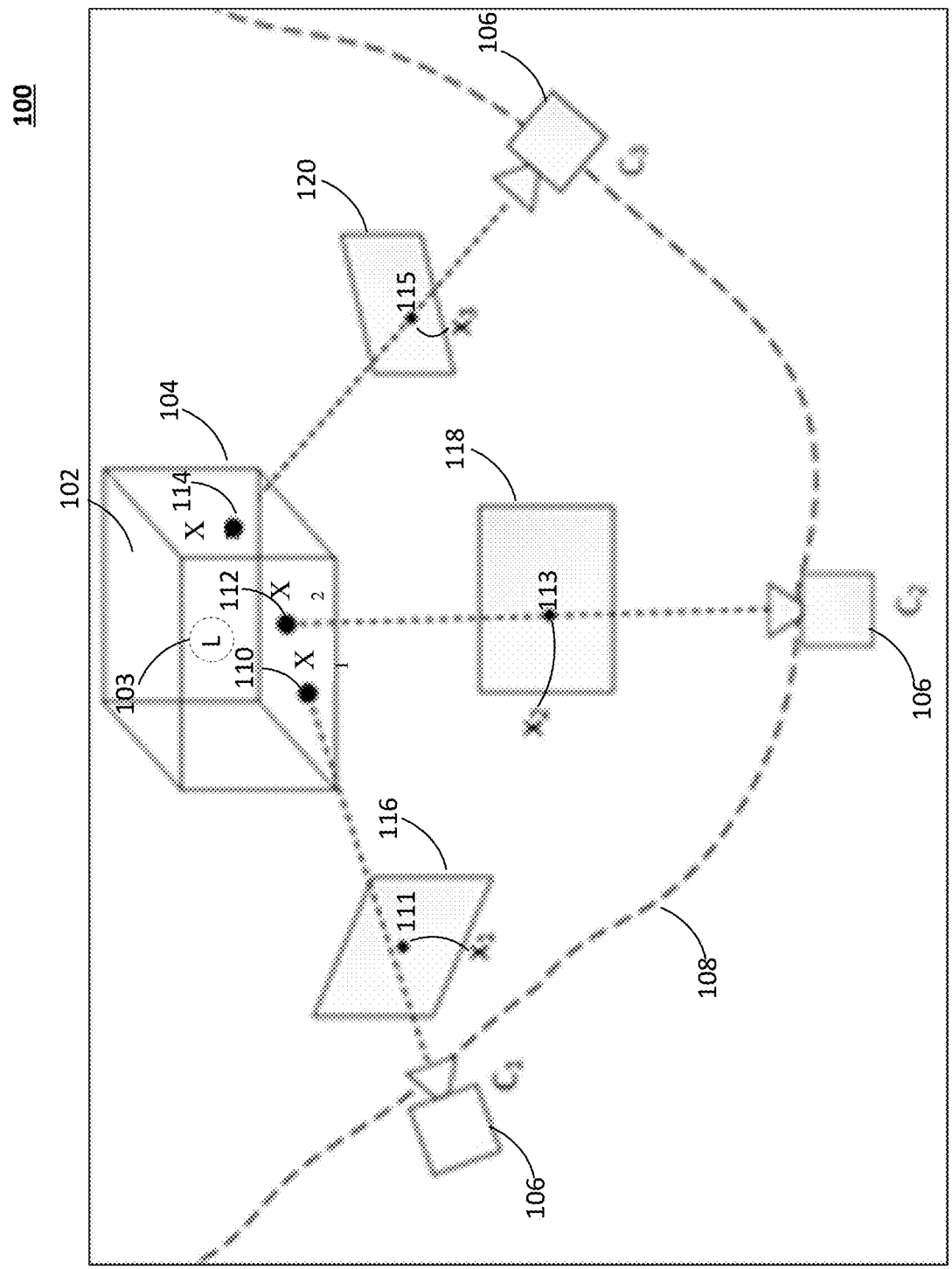
FIG. 1 is a diagram illustrating a generic SLAM system.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

DESCRIPTION OF EMBODIMENTS

Technology to provide map point consensus based-outlier rejection (MC-OR) to accommodate depth noise in visual SLAM systems. This is accomplished by detecting noise affected 3-D features and landmarks and conducting outlier rejection prior to the optimization process in SLAM to improve the accuracy of pose estimation. It utilizes consensus amongst redundant data to increase confidence in the pose estimation.

MC-OR is a pre-filtering process that occurs prior to optimization in state-of-the-art SLAM frameworks for pose estimation. The pre-filtering process employs a dynamic centroid of 3-D features of a landmark. When a feature is detected from another viewpoint, the geometric centroid is recomputed for that viewpoint. A group of all 3-D features pertaining to the same landmark being observed over multiple viewpoints is defined as a feature cluster for the landmark. The process determines distance error metrics amongst feature clusters, map point, and the centroid to detect inconsistencies. The distance error metrics include individual distances between 3-D features and the centroid, the average of all of the individual distances between 3-D features and the centroid, individual distances between 3-D features and the map point, the average of all of the individual distances between 3-D features and the map point, and the distance between the centroid and the map point. These metrics are collected across camera viewpoints, and therefore, form consensus.

The process further categorizes these metrics into two hierarchies, feature level metrics and cluster level metrics. Feature level metrics include the individual distances between 3-D features and the centroid and the individual distances between 3-D features and the map point. Cluster level metrics include the average of the individual distances between 3-D features and the centroid, the average of individual distances between 3-D features and the map point, and the distance between the centroid and the map point. Cluster level metrics track whether landmarks for the slam framework are good. Feature level metrics determine whether the manifestation of a landmark (i.e., 3-D features) onto one or more camera viewpoints is consistent with the rest of the 3-D features, map point, and estimated camera pose.

A tunable threshold based hierarchical decision flow for removing landmarks and features is employed. First, compactness of the feature cluster is checked by thresholding cluster level metrics. Highly variant clusters are removed. Next, each feature in the feature cluster is assessed by thresholding feature level metrics. If the metric is higher than the threshold for a given feature, that feature is removed. The remaining features are fed into the slam optimization framework.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 is a diagram illustrating a generic SLAM system 100. The generic SLAM system 100 comprises an unknown environment 102 shown within a cube 104 and an agent 106. The unknown environment 102 is representative of the outside world having one or more objects in a 3-D space. In this instance, the agent 106 is shown as a camera 106 moving along a path 108. Although not explicitly shown in the diagram, the camera 106 includes, and may also be attached to, one or more sensors. The objective of the camera 106 is to build a map of the unknown environment 102 while also determining its own location within the map. The camera 106 accomplishes this using feature-based SLAM techniques. The camera 106 is shown initially as being located at position (or pose) C1. The camera 106 moves from position C1 to position (or pose) C2 and then from position C2 to position (or pose) C3 at various time instances. As the camera 106 moves from position C1 to position C3, it is shown capturing images 116, 118, and 120 onto planar surfaces at the various time instances along the path 108. L 103 represents a landmark at an unknown location in the unknown environment 102. x1, x2 and x3, shown as 111, 113 and 115, respectively, represent 2-D feature points of landmark L 103 onto images 116, 118 and 120, respectively. X1, X2 and X3, shown as dots 110, 112 and 114 within the unknown environment 102 of the cube 104, are 3-D projections of feature points. Landmarks are points in the 3-D world which manifest as 2-D features (in captured images from different viewpoints) such that they can be easily re-observed and distinguished from within the unknown environment 102. The landmarks enable the camera to localize itself (i.e., find out where it is located).

In a generic SLAM system, landmarks are extracted from the environment using the camera's sensory inputs (as well as other sensory inputs from other sensors within the system) and as the camera moves to a new position, landmarks are continuously extracted at the camera's new position. The system may then try to cross-correlate or associate the newly extracted landmarks with previously seen landmarks. If the newly extracted landmark cannot be associated with a previously seen landmark, the landmark is classified as new. The SLAM system will estimate the camera's position and map the surroundings based on the movement of the camera and the landmarks.

One problem associated with SLAM is that not all landmarks are good. Also, the types of sensors used by the SLAM system may also pose a problem. With monocular vision (i.e., one camera), a map of the environment and the locations of the camera are estimated by observing a landmark from two different view-points of the same camera (i.e., triangulation). At the commencement of SLAM, neither location of the object nor movement of the camera is known. SLAM may determine only relative distances of landmarks and camera location, and therefore estimated camera trajectory may differ from the true trajectory by a scale. This problem is an issue known as 'scale and initialization'. Inferring depth for detected feature points is important for Visual Odometry SLAM, as monocular vision is prone to suffer from scale and initialization issues.

As previously indicated, depth sensing is missing in visual cameras and is often inferred through techniques such as, for example, active stereo (structured light), passive stereo (calibrated stereo cameras) or through other sensor modalities, such as, for example, radar, infrared, IMUs, etc. These techniques suffer from accuracy issues because a lot of sensors that provide depth are inherently noisy.

Apart from the unavailability of a depth map in certain regions, there are two categories of inaccuracies that may be prevalent in depth maps. The first is axial noise. Axial noise is the result of an error in depth along the depth axis. The depth axis is shown in FIG. 1 as being the line between the camera and the pixel in the projection plane, for example, the line between C1 and x1. The second inaccuracy is lateral noise. Lateral noise is the depth of a current pixel being influenced or carried over from neighborhood pixels. Most SLAM approaches use joint optimization techniques over detected/tracked features and the estimated poses of camera viewpoints, minimizing the projective error between the observed and estimated locations of landmarks in the 3-D world coordinates. This often helps in overcoming axial depth inaccuracies. However, results show that the lateral noise badly impacts these optimization techniques as feature correspondences may be completely lost (see FIG. 2, discussed below). In scenarios where a large set of feature points fall on depth boundaries, the impact may be even higher as lateral noise is more prevalent on edges. Thus, identifying such feature points and pruning them is critical for higher fidelity of pose estimation.

Figure 2:
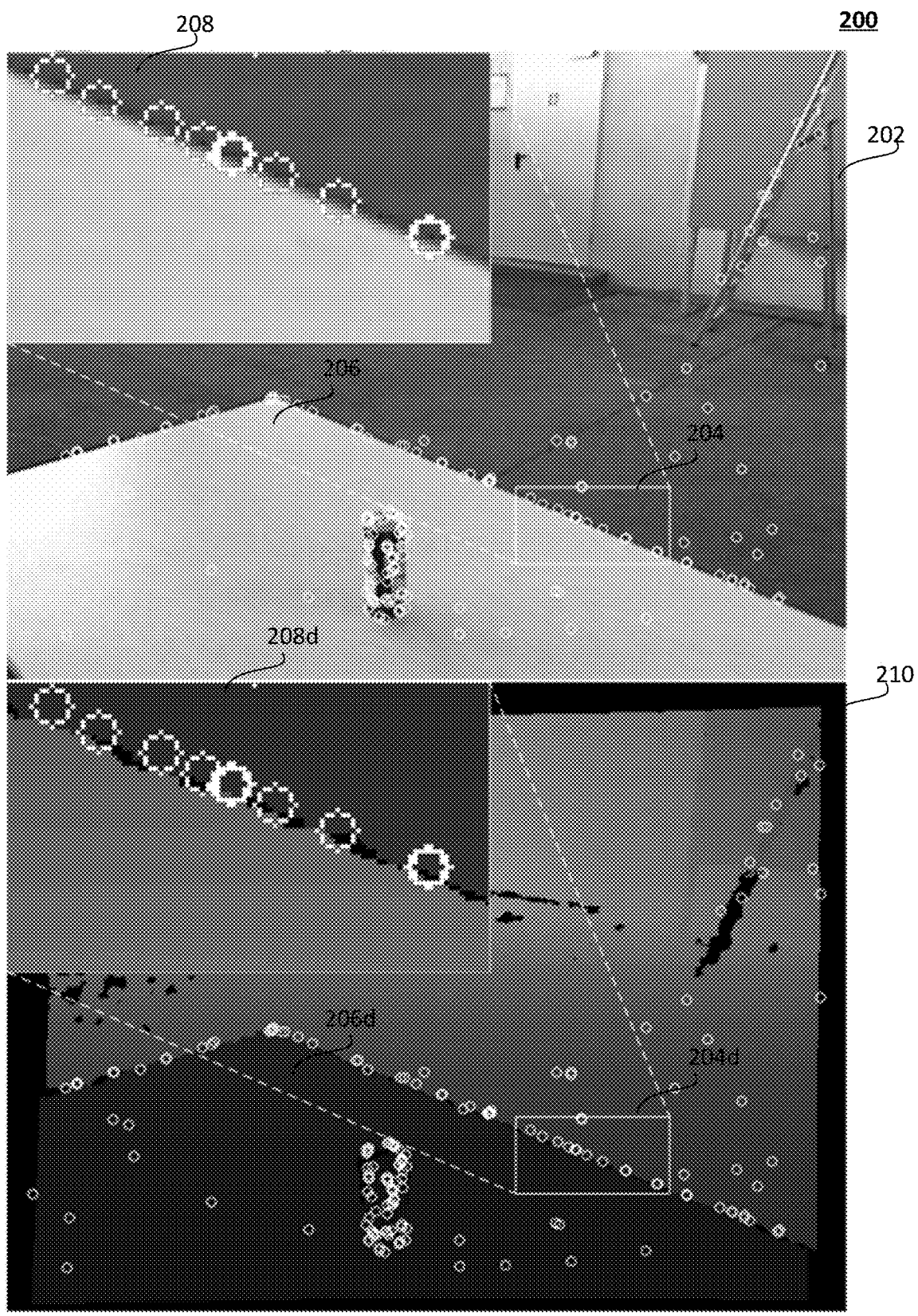
FIG. 2 is an example diagram illustrating depth inconsistencies for features in a visual image versus a depth image as a result of lateral noise in a SLAM system.

FIG. 2 is an example diagram 200 illustrating depth inconsistencies for features in a visual image versus a depth image as a result of lateral noise in a SLAM system. An upper portion of diagram 200 represents a visual image 202. The visual image 202 includes a plurality of features shown as white circles. Highlighted in a box 204 are features of edges of an observed table 206. The centers of the white circles are accurately placed along the edges of the observed table 206. This is shown with more clarity using a zoomed in visual image 208 of box 204.

A lower portion of diagram 200 represents a corresponding depth image 210 for the visual image 202. The corresponding depth image 210 includes a plurality of features corresponding to the plurality of features in visual image 202, shown as white circles. In the corresponding depth image 210, the centers of the white circles along the edges of the observed table 206d, highlighted by the box 204d are no longer within the edges of the observed table 206d. Instead, they fall outside of the edges of the observed table 206d (shown more clearly using the zoomed in view 208d of the observed table 206d) as if the features were located on the floor (i.e., background) of the depth image 210. The depth sensors, which provide the data for the depth image, cause a lateral shift in the pixels based on the lateral depth noise component. As shown in the corresponding depth image 210, the features of the visual image 202 and the corresponding depth image 210 do not show a 1:1 pixel-to-pixel correspondence. In the visual image 202, the features are shown to be located on the edge of the table, while in the corresponding depth image 210, the same features are shown as being shifted over to the right of the table, giving the appearance to the SLAM system that these same features are lying on the ground. The shifted features in the corresponding depth image 210, enlarged using the zoomed in view 208d, are referred to as outliers or outlier features when they are shifted outside of or away from the intended feature point of the landmark. In current SLAM systems, these outlier features are fed into a pose estimation process along with the good features, causing a misinterpretation of the 3-D position of these points. This has a detrimental impact on the pose estimation of the camera.

In embodiments, map point consensus based-outlier rejection (MC-OR) is performed within a SLAM framework prior to optimization to detect noise affected 3D features and landmarks and conduct outlier rejection. MC-OR is a pre-filtering process that improves the fidelity of pose estimation used in state-of-the-art SLAM frameworks by removing the outliers from the SLAM system prior to pose estimation.

Figure 3:
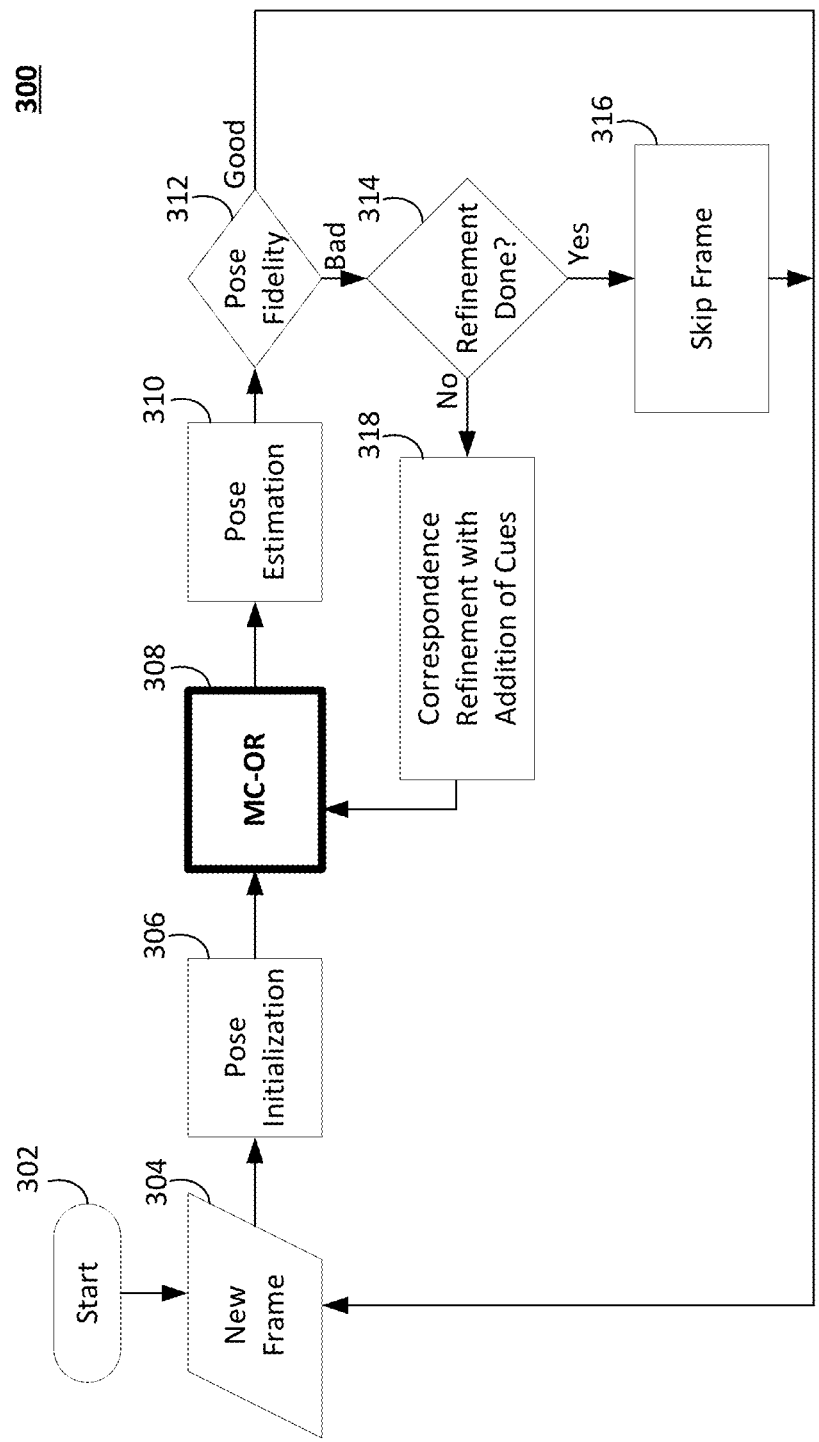
FIG. 3 is a flow diagram of a SLAM framework incorporating MAP-Point Consensus Based-Outlier Rejection (MC-OR) according to an embodiment.

FIG. 3 is a flow diagram 300 of a SLAM framework incorporating MAP-Point Consensus Based-Outlier Rejection (MC-OR) according to an embodiment. As highlighted in flow diagram 300, MC-OR occurs immediately after pose initialization and prior to pose estimation to aid in preventing outliers, due to lateral noise from the sensors, from being processed during pose estimation, thereby enabling more accurate SLAM results.

The SLAM framework begins at block 302, where it immediately proceeds to block 304. In block 304, a new frame is received as input. The SLAM process immediately proceeds to block 306.

In block 306, pose initialization is performed. Pose initialization includes coarse level optimization techniques, such as, for example, motion-models, N-point based PnP (Perspective-n-Point) style guessing, ICP (Iterative Closest Point), etc., all of which are well-known to one skilled in the relevant art(s), to aid in providing an initial estimate of the camera pose. While this estimate may not be entirely accurate, it provides a starting point for determining the camera pose. The process then proceeds to highlighted block 308.

In block 308, MC-OR is performed. MC-OR is a hierarchical process that detects depth noise affected 3-D features and landmarks and conducts outlier rejection prior to the performance of pose estimation. In other words, the MC-OR process identifies feature points affected by lateral noise and prunes them to enable a higher fidelity of pose estimation.

MC-OR is explained in detail below with reference to FIGS. 4A and 4B. The process proceeds to block 310.

In block 310, pose estimation is performed. Pose estimation utilizes the initial pose estimate determined in block 306 and refines the pose estimate using such techniques as, for example, bundle adjustment and extended Kalman Filter, both of which are well known to those skilled in the relevant art(s). Pose estimation utilizes the visual, depth information of 3-D points seen in the current image and previous images to jointly optimize the camera poses and 3-D locations of landmarks. The process then proceeds to decision block 312.

In decision block 312, it is determined whether the pose fidelity of the camera is good or bad. Given an estimated camera pose and a ground truth camera pose (as provided using datasets), quantitative metrics are used to assess how similar the poses are. If they are similar, then there is high or good pose fidelity. The process then proceeds back to block 304 to receive a new frame. If they are not similar, then there is low or bad pose fidelity, and the process proceeds to decision block 314.

In decision block 314, it is determined whether refinement of the pose estimation is completed. SLAM frameworks, like, for example, ORB-SLAM2, conduct multiple pose refinements iteratively based on certain optimization performance indicators. If refinement of the pose estimation is completed, the process proceeds to block 316.

In block 316, the frame is skipped. The process then proceeds back to block 304 to receive a new frame.

Returning back to decision block 314, if it is determined that refinement of the pose estimation is not completed, the process proceeds to block 318.

In block 318, correspondence refinement with additional cues is performed. Correspondence refers to the association of several sightings of the same landmark across multiple camera views. As part of pose estimation, a more accurate understanding of the camera poses and the landmark locations are gained. Using this additional information, associations between points may be modified and/or corrected to fit poses more precisely. The process then returns to block 308 to perform MC-OR. In the absence of MC-OR (block 308), the process will return to block 310.

Figure 4A:
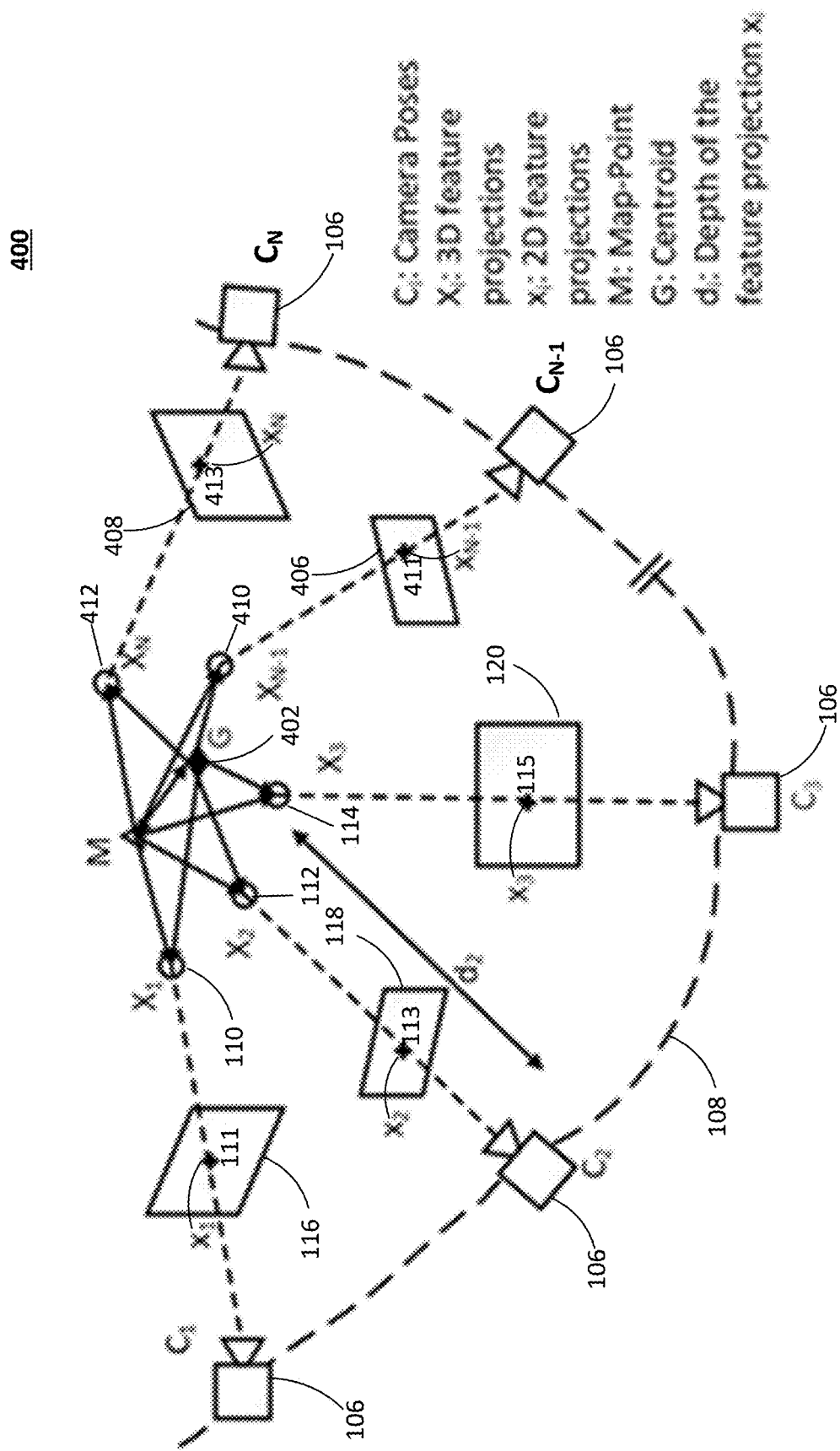
FIG. 4A is a diagram illustrating a SLAM system incorporating MC-OR according to an embodiment.

FIG. 4A is a diagram illustrating a SLAM system 400 incorporating MC-OR according to an embodiment. For simplification purposes, assume that the SLAM system 400 only has one landmark that is tracked across N camera views. The SLAM system 400 is similar to the generic SLAM system 100 described above with respect to FIG. 1. The SLAM system 400 comprises an unknown environment representing the outside world in 3-D space (not explicitly shown) and the camera 106 moving along the path 108. Again, the objective of the camera 106 is to build a map of the unknown environment while also determining its own location within the map. This is accomplished using known feature-based SLAM techniques with the addition of a new technique referred to as MC-OR. MC-OR is used to help mitigate the effects of lateral noise by removing inaccurate landmarks and feature points (i.e., feature points that possess noisy depth data, thereby causing the apparent locations of the feature points to be way off from their actual locations) prior to optimization. The removal of these inaccurate landmarks and feature points prior to optimization results in a higher fidelity pose estimation and better performance of the SLAM system 400 in general.

As shown in FIG. 4, the landmark is tracked across N camera views (C1, C2, ..., $C_{N-1}$, $C_N$), where the landmark is perceived from each of these views as 2-D features (shown as $x_i$). Using the depth of these points, $d_i$ (obtained from depth sensors or through stereo matching), the 2-D features may be projected into 3-D space as 3-D features, $X_i$. Note that stereo matching is well-known to those skilled in the relevant art(s).

To incorporate MC-OR into the SLAM system 400, the SLAM system 400 includes a dynamic geometric centroid G (402) of the 3-D features, $X_i$ (shown as $X_1$, $X_2$, ..., $X_{N-1}$, $X_N$) for the given landmark. Each of the 3-D features, $X_i$, are detected when the camera 106 views the same landmark from another viewpoint (i.e., $C_1$, $C_2$, ..., $C_{N-1}$, $C_N$).

When a 3-D feature is detected from another viewpoint, the geometric centroid, G (402) is recomputed. A group of all of the 3-D features pertaining to the same landmark being observed over multiple viewpoints is referred to as a feature cluster $\{X_i\}$. The geometric centroid G of a feature cluster $\{X_i\}$ is defined as:

$$G = \frac{1}{N}\sum_{i=1}^{N} X_i \qquad \text{Equation 1}$$

Every SLAM system maintains an optimized 3-D location corresponding to a feature called a map point or a landmark. A map point for the same feature is denoted by M.

MC-OR uses distance-error metrics amongst feature cluster $\{X_i\}$, Map point (shown as M in FIG. 4), and the dynamic geometric centroid, G 204, to detect inconsistencies amongst the 3-D feature points $X_i$ of a landmark. In one embodiment, Euclidean distances may be used for the distance-error metrics. In other embodiments, other types of distance measurements may be used for the distance-error metrics, such as, for example, weighted distance, Manhattan distance, Mahalanobis distance, or other non-Euclidean distances. Once the inconsistencies are tracked, tunable thresholds are used to determine whether or not to remove a landmark or one or more features of a landmark based on the inconsistencies.

There are two hierarchical levels of distance-error metrics for outlier rejection. The first is feature level metrics. Feature level metrics are used to define scores individually for each 3-D feature. The feature level metrics portray how close the individual feature is to the rest of the data. The feature level metrics aid in providing a specific understanding of the adherent and deviant 3-D projections of the landmark and help to prune the bad projections individually. Also, if a majority of the 3-D features of a particular camera frame have high feature level error metrics, it is very likely that the camera pose is inaccurate. Thus, the feature level metrics aid in providing essential cues in performance indication. There are two feature level metrics. The first feature level metric comprises individual distances between 3-D features and the map point:

$$MCE_{FL,1,i} = \|M - X_i\| \qquad \text{Equation 2}$$

The second feature level metric comprises individual distances between 3-D features and the centroid:

$$MCE_{FL,2,i} = \|G - X_i\| \qquad \text{Equation 3}$$

Cluster level metrics are used to define overall scores for a cluster as a whole. The first two cluster level error metrics (Equation 4 and Equation 5, shown below) represent the average values of the feature level metrics (Equation 2 and Equation 3, shown above). The last cluster level error metric (Equation 6) conveys how close the map point is to the statistical mean of the depth data. The cluster level error metrics provide a notion of consensus. They denote how consistent the multiple sightings of a landmark are and, in general, how well observed the landmark is. If the cluster level errors are high, it follows that the landmark is bad to consider as an interest point.

$$MCE_{CL,1} = \frac{1}{N}\sum_{i=1}^{N}\|M - X_i\| \quad \text{Equation 4}$$

$$MCE_{CL,2} = \frac{1}{N}\sum_{i=1}^{N}\|G - X_i\| \quad \text{Equation 5}$$

$$MCE_{CL,3} = \|M - G\| \quad \text{Equation 6}$$

While distinct thresholds may be applied to each of these error metrics individually, the metrics are grouped based on similarity and subject similar metrics to the same thresholds: (i) distances between the map point and 3-D features and their average (Equation 2 and Equation 4), (ii) distances between the centroid and 3-D features and their average (Equation 3 and Equation 5), and (iii) distances between the centroid and the map point (Equation 6). The corresponding thresholds are $\tau_{M,F}$, $\tau_{G,F}$ and $\tau_{M,G}$.

After computing the feature level and cluster level error metrics, a hierarchical approach is adopted where in the aberrant clusters are first culled using the cluster level metrics and for the remaining clusters, the individual feature level observations are culled using the feature level metrics. Only those features that pass both tests enter the pose estimation framework. The running centroid serves as an estimate of the map point prior to the optimization, thus helping in pre-filtering observations before the optimization. Even between multiple runs of the optimization for a frame, MC-OR ensures an updated centroid for effectively analyzing the situation. Using a threshold on the distance between the map point and the centroid constrains the map point and poses of the camera to be close to the statistical mean of the depth data. Where the map point location is updated based on cumulative projective errors across other features as well, the centroid is affected only by the depth of that particular feature and thus provides a pinpointed qualitative assessment of the feature cluster.

With the exception of the operation of the MC-OR, SLAM system 400 operates in a similar manner to the generic SLAM system 100 described above with respect to FIG. 1.

Figure 4B:
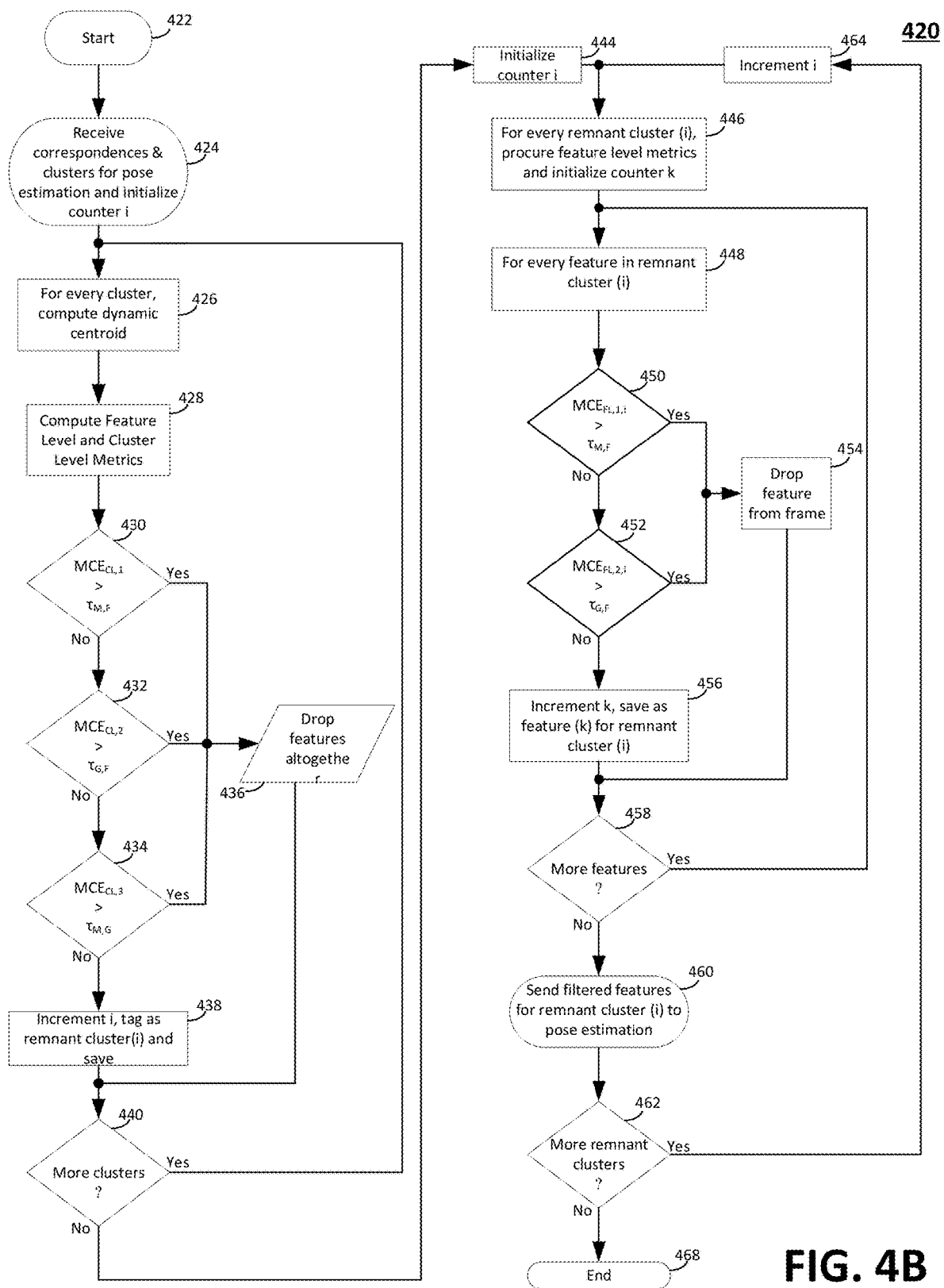
FIG. 4B is a flow diagram describing an example method of Map-Point Consensus Based-Outlier Rejection (MC-OR) according to an embodiment.

FIG. 4B is a flow diagram 420 describing an example method of Map-Point Consensus Based-Outlier Rejection (MC-OR) according to an embodiment. The method 420 may generally be implemented in a system such as, for example, the SLAM system 400 as shown in FIG. 4. More particularly, the method 420 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 420 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural components that are native to hardware (e.g., host processor, central processing unit (CPU), microcontroller, etc.).

The process begins in block 422, where the process immediately proceeds to block 424. In block 424, correspondences & clusters for pose estimation are received. This includes 2-D features, $x_i$, 3-D features, $X_i$, depth data, $d_i$, and any other data needed from the SLAM framework. Also, counter i is initialized to 0. The process then proceeds to block 426.

In block 426, for every cluster, the dynamic centroid is computed using Equation 1. The process then proceeds to block 428.

In block 428, feature level error metrics and cluster level error metrics are computed using Equations 2-6. The process then proceeds to decision block 430.

In decision block 430, it is determined whether the average of the distances between the map point M and 3-D features is greater than the threshold $\tau_{M,F}$. If the average of the distances between the map point M and 3-D features is greater than the threshold $\tau_{M,F}$, the process proceeds to block 436 where all features are dropped. The process then proceeds to decision block 440.

In decision block 440, it is determined whether there are more clusters to evaluate? If there are more clusters to evaluate, the process proceeds back to block 426 to compute the dynamic centroid G for the next cluster.

Returning to decision block 430, if the average of the distances between the map point M and 3-D features is not greater than the threshold $\tau_{M,F}$, then the process proceeds to decision block 432.

In decision block 432, it is determined whether the average of the distances between the dynamic centroid G and the 3-D features is greater than the threshold $\tau_{G,F}$. If the average of the distances between the dynamic centroid G and 3-D features is greater than the threshold $\tau_{G,F}$, then the process proceeds to block 436 where all features are dropped. The process then proceeds to decision block 440.

Returning to decision block 432, if it is determined that the average of the distances between the dynamic centroid G and 3-D features is not greater than the threshold $\tau_{G,F}$, then the process proceeds to decision block 434.

In decision block 434, it is determined whether the distance between the dynamic centroid G and the map point M is greater than the threshold $\tau_{M,G}$. If it is determined that the distance between the dynamic centroid G and the map point M is greater than the threshold $\tau_{M,G}$, then the process proceeds to block 436 where all features are dropped. The process then proceeds to decision block 440.

Returning to decision block 434, if it is determined that the distance between the dynamic centroid G and the map point M is not greater than the threshold $\tau_{M,G}$, then the process proceeds to block 438.

In block 438, counter i is incremented and cluster (i) is tagged and saved as a remnant cluster. The process then proceeds to decision block 440.

Returning to decision block 440, if it is determined that there are no more clusters to evaluate, the process proceeds to block 444, where counter i is initialized back to 1. The process then proceeds to block 446.

In block 446, for every remnant cluster (i), feature level metrics are procured and counter k is initialized to 0. The process then proceeds to block 448, where each feature of remnant cluster (i) is evaluated. The process proceeds to decision block 450.

In decision block 450, it is determined whether the individual distance between the 3-D feature and the map point M is greater than the threshold $\tau_{M,F}$. If it is determined that the individual distance between the 3-D feature and the map point M is greater than the threshold $\tau_{M,F}$, then the process proceeds to block 454 where the feature is dropped from the frame. The process then proceeds to block 458.

In block 458, it is determined whether there are more features for remnant cluster (i). If there are more features to evaluate for remnant cluster (i), then the process proceeds back to block 448 to evaluate the next feature.

Returning to decision block 450, if it is determined that the individual distance between the 3-D feature and the map point M is not greater than the threshold $\tau_{M,F}$, then the process proceeds to decision block 452.

In decision block 452, it is determined whether the individual distance between the 3-D feature and the dynamic centroid G is greater than the threshold $\tau_{G,F}$. If it is determined that the individual distance between the 3-D feature and the dynamic centroid G is greater than the threshold $\tau_{G,F}$, the process proceeds to block 454 where the feature is dropped from the frame. The process then proceeds to block 458.

Returning to decision block 452, if it is determined that the individual distance between the 3-D feature and the dynamic centroid G is not greater than the threshold $\tau_{G,F}$, then the process proceeds to block 456.

In block 456, counter k is incremented and the feature is saved as feature (k) for remnant cluster (i). The process then proceeds to decision block 458.

Returning to decision block 458, if it is determined that there are no more features to evaluate for cluster (i), the process proceeds to block 460. In block 460, the filtered features for remnant cluster (i) are sent to pose estimation. The process then proceeds to decision block 462.

In decision block 462, it is determined if there are more remnant clusters to be evaluated. If it is determined that there are more remnant clusters to be evaluated, then the process proceeds to block 464.

In block 464, counter i is incremented. The process then proceeds back to block 446 to evaluate the features for the next remnant cluster (i).

Returning back to decision block 462, if it is determined that there are no more remnant clusters to be evaluated, then the process proceeds to block 468, where the process ends.

Since the distance error metrics are collected across camera viewpoints, they form consensus. Using a consensus based approach and a hierarchical decision flow, MC-OR makes a distinction between bad features vs. bad landmarks. High scores for feature level metrics with low cluster level metrics scores help in identifying features that are inconsistent for few camera viewpoint(s). This avoids degradation of pose estimation for affected camera viewpoints without dropping the landmark completely. High scores for cluster metrics indicate that all features for a landmark are inconsistent with estimated poses of camera viewpoints, so it is better to drop this landmark and stop tracking it in future camera viewpoints. This distinction and differential treatment contribute greatly towards improved SLAM performance. In addition, MC-OR may also detect moving objects or landmarks in a dynamic scene, where moving coordinates of a landmark are likely to degrade SLAM performance if they are not tracked with appropriate motion models.

Figure 5:
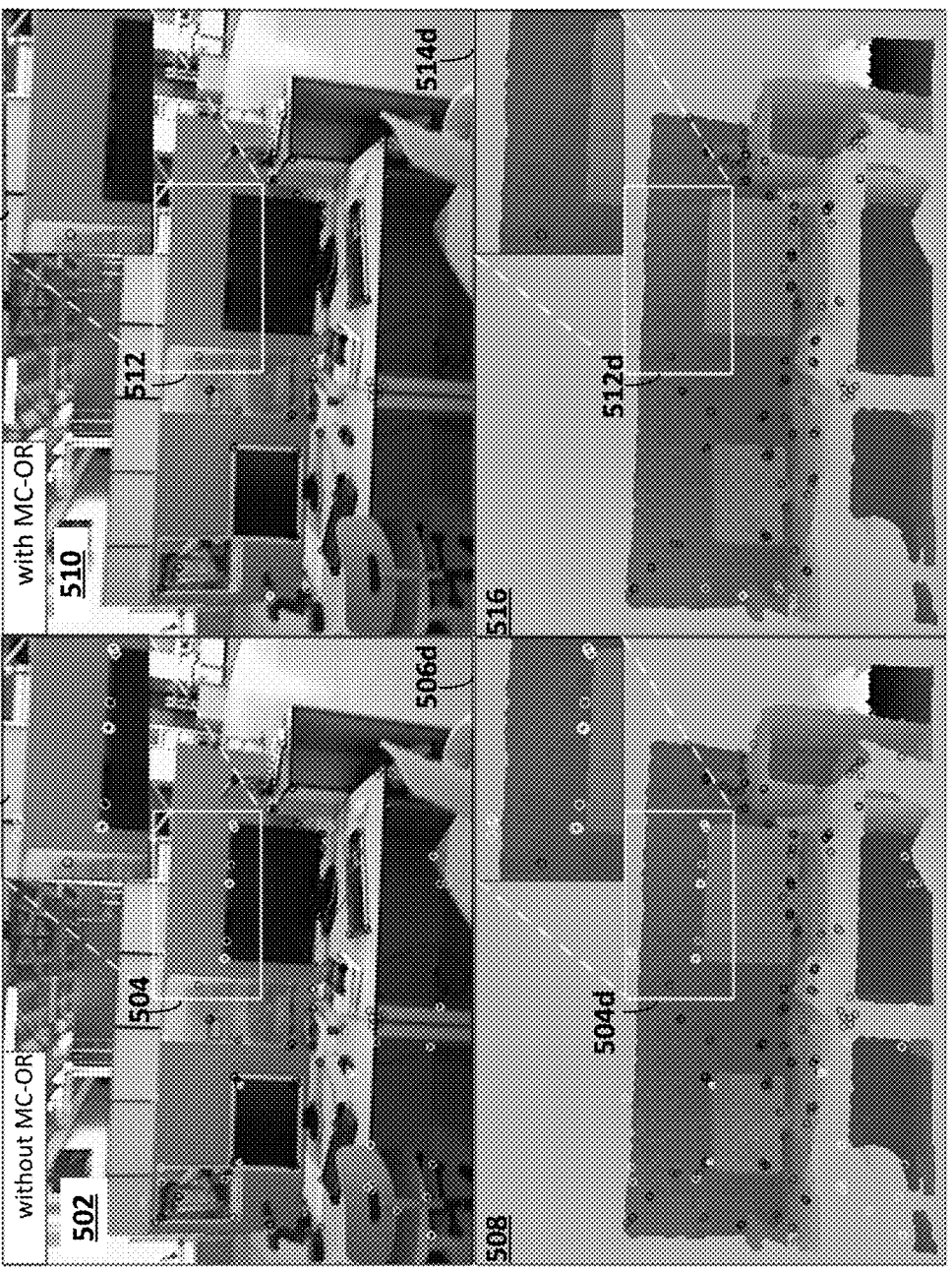
FIG. 5 is an example diagram illustrating images and corresponding depth maps for a SLAM system without MC-OR and with MC-OR according to an embodiment.

FIG. 5 is an example diagram 500 illustrating images and corresponding depth maps for a SLAM system without MC-OR and with MC-OR according to an embodiment. The diagram 500 shows two similar RGB images at the top and two corresponding depth maps at the bottom. An RGB image 502 in the top left-hand corner is representative of a SLAM system without MC-OR. A corresponding depth map 508 for RGB image 502 is displayed in the lower left-hand corner of the diagram 500. An RGB image 510 in the top right-hand corner is representative of a SLAM system with MC-OR. A corresponding depth map 516 for RGB image 510 is displayed in the lower right-hand corner of the diagram 500. The white and black circles found in diagram 500 represent detected features. The white circles represent detected features at the boundaries affected by lateral depth noise, also referred to as outliers. The black circles represent detected features that are not affected by lateral depth noise and, are therefore, referred to as inliers. Each of 502, 508, 510 and 516 show areas 504, 504d, 512, 512d that are zoomed into, 506, 506d, 514, 514d, respectively, to show detected features along boundary lines and how these features are handled without MC-OR and with MC-OR.

Image 502 and it's corresponding depth map 508, located on the left, show feature points with state-of-the-art methods in ORB-SLAM 2 (Oriented FAST (Features from Accelerated Segment Test) and Rotated BRIEF (Binary Robust Independent Elementary Features-SLAM (Simultaneous Localization and Mapping) version 2)). Both image 502 and depth map 508 exhibit multiple points (i.e., white circles) at the boundaries affected by lateral depth noise.

Image 510 and corresponding depth map 516 (located on the right) show feature points with the incorporation of MC-OR. In contrast to the image 502 and depth map 508 on the left, the image 510 and the depth map 516 on the right, in which MC-OR was implemented, show the white circles mostly omitted, indicating the effectiveness of MC-OR in identifying depth features that have a high lateral component of depth noise and removing them for pose estimation. By utilizing consensus information amongst other viewpoints for the same feature, MC-OR is able to reject depth observations that stray from the rest of the feature cluster to enable a higher fidelity with pose estimation. With MC-OR, feature points with marginal depth inaccuracies may stay as is, with their depth values being refined as part of the optimization procedure.

Figure 6:
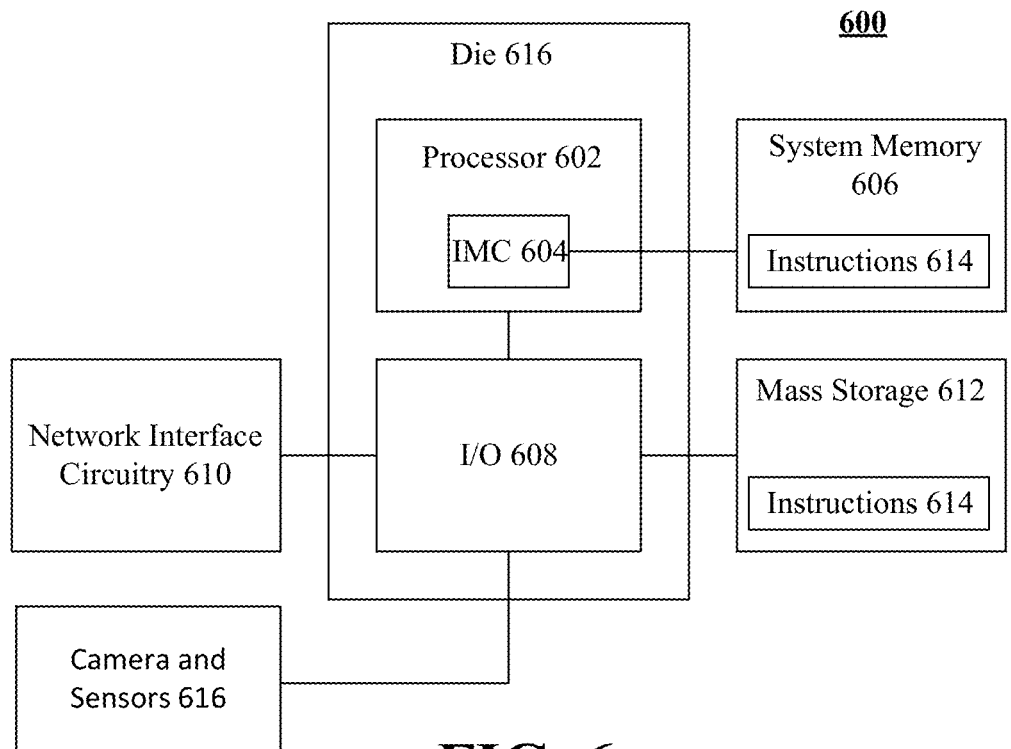
FIG. 6 is a block diagram of an example SLAM system having MC-OR according to an embodiment.

FIG. 6 shows a system 600 that may be readily substituted for the SLAM system shown above with reference to FIG. 4. The illustrated system 600 includes a processor 602 (e.g., host processor, central processing unit/CPU) having an integrated memory controller (IMC) 604 coupled to a system memory 606 (e.g., volatile memory, dynamic random access memory/DRAM). The processor 602 may also be coupled to an input/output (I/O) module 608 that communicates with network interface circuitry 610 (e.g., network controller, network interface card/NIC), mass storage 612 (non-volatile memory/NVM, hard disk drive/HDD, optical disk, solid state disk/SSD, flash memory) and a mobile camera and sensors 616. The network interface circuitry 610 may receive information obtained from the mobile camera and sensors, such as 2-D features $x_i$, 3-D features $X_i$, depth data $d_i$, landmarks, images and any other data needed from the SLAM framework (as shown in FIG. 4), wherein the system memory 606 and/or the mass storage 612 may be memory devices that store instructions 614, which when executed by the processor 602, cause the system 600 to perform one or more aspects of the method 300 (FIG. 3), already discussed and the method 420 (FIG. 4B), already discussed. Thus, execution of the instructions 614 may cause the SLAM system 600 to receive a new frame; provide an initial estimate of a camera pose; detect noise affected 3-D features and landmarks and conduct outlier rejection; utilize the initial estimate of the camera pose, visual and depth information of 3-D feature points in a current image and previous images to optimize the camera pose; determine the fidelity of the camera pose; and perform correspondence refinement to obtain an enhanced camera pose. The processor 602 and the IO module 608 may be incorporated into a shared die 616 as a system on chip (SoC).

Figure 7:
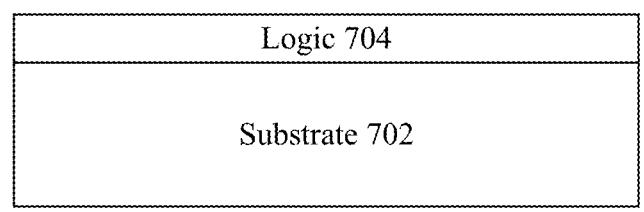
FIG. 7 is an illustration of an example of a semiconductor package apparatus according to an embodiment.

FIG. 7 shows a semiconductor package apparatus 700 (e.g., chip) that includes a substrate 702 (e.g., silicon, sapphire, gallium arsenide) and logic 704 (e.g., transistor array and other integrated circuit/IC components) coupled to the substrate 702. The logic 704, which may be implemented in configurable logic and/or fixed-functionality logic hardware, may generally implement one or more aspects of the method 300 (FIG. 3), already discussed and method 420 (FIG. 4B), already discussed.

Figure 8:
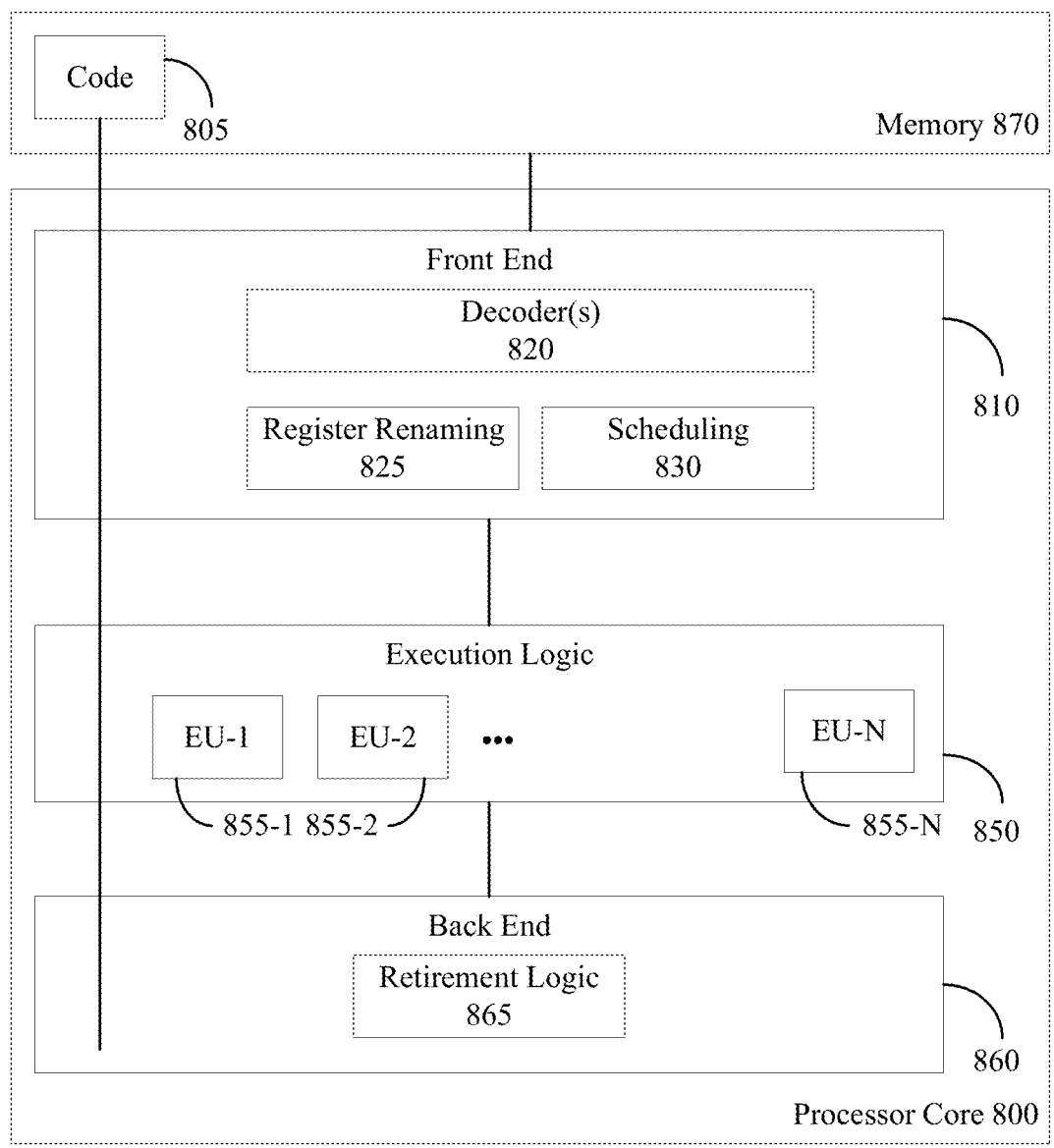
FIG. 8 is a block diagram of an exemplary processor according to an embodiment.

FIG. 8 illustrates a processor core 800 according to one embodiment. The processor core 800 may be the core for any type of processor, such as a micro-processor, an embedded processor, a digital signal processor (DSP), a network processor, or other device to execute code. Although only one processor core 800 is illustrated in FIG. 8, a processing element may alternatively include more than one of the processor core 800 illustrated in FIG. 8. The processor core 800 may be a single-threaded core or, for at least one embodiment, the processor core 800 may be multithreaded in that it may include more than one hardware thread context (or "logical processor") per core.

FIG. 8 also illustrates a memory 870 coupled to the processor core 800. The memory 870 may be any of a wide variety of memories (including various layers of memory hierarchy) as are known or otherwise available to those of skill in the art. The memory 870 may include one or more code 805 instruction(s) to be executed by the processor core 800, wherein the code 805 may implement the method 300 (FIG. 3), already discussed and the method 420 (FIG. 4B), already discussed. The processor core 800 follows a program sequence of instructions indicated by the code 805. Each instruction may enter a front end portion 810 and be processed by one or more decoders 820. The decoder 820 may generate as its output a micro operation such as a fixed width micro operation in a predefined format, or may generate other instructions, microinstructions, or control signals which reflect the original code instruction. The illustrated front end portion 810 also includes register renaming logic 825 and scheduling logic 830, which generally allocate resources and queue the operation corresponding to the convert instruction for execution.

The processor core 800 is shown including execution logic 850 having a set of execution units 855-1 through 855-N. Some embodiments may include a number of execution units dedicated to specific functions or sets of functions. Other embodiments may include only one execution unit or one execution unit that can perform a particular function. The illustrated execution logic 850 performs the operations specified by code instructions.

After completion of execution of the operations specified by the code instructions, back end logic 860 retires the instructions of the code 805. In one embodiment, the processor core 800 allows out of order execution but requires in order retirement of instructions. Retirement logic 865 may take a variety of forms as known to those of skill in the art (e.g., re-order buffers or the like). In this manner, the processor core 800 is transformed during execution of the code 805, at least in terms of the output generated by the decoder, the hardware registers and tables utilized by the register renaming logic 825, and any registers (not shown) modified by the execution logic 850.

Although not illustrated in FIG. 8, a processing element may include other elements on chip with the processor core 800. For example, a processing element may include memory control logic along with the processor core 800. The processing element may include I/O control logic and/or may include I/O control logic integrated with memory control logic. The processing element may also include one or more caches.

Referring now to FIG. 9, shown is a block diagram of a computing system 900 in accordance with an embodiment. Shown in FIG. 9 is a multiprocessor system 900 that includes a first processing element 970 and a second processing element 980. While two processing elements 970 and 980 are shown, it is to be understood that an embodiment of the system 900 may also include only one such processing element.

As shown in FIG. 9, each of processing elements 970 and 980 may be multicore processors, including first and second processor cores (i.e., processor cores 974a and 974b and processor cores 984a and 984b). Such cores 974a, 974b, 984a, 984b may be configured to execute instruction code in a manner similar to that discussed above in connection with FIG. 8.

Each processing element 970, 980 may include at least one shared cache 996a, 996b. The shared cache 996a, 996b may store data (e.g., instructions) that are utilized by one or more components of the processor, such as the cores 974a, 974b and 984a, 984b, respectively. For example, the shared cache 996a, 996b may locally cache data stored in a memory 932, 934 for faster access by components of the processor. In one or more embodiments, the shared cache 996a, 996b may include one or more mid-level caches, such as level 2 (L2), level 3 (L3), level 4 (L4), or other levels of cache, a last level cache (LLC), and/or combinations thereof.

While shown with only two processing elements 970, 980, it is to be understood that the scope of the embodiments are not so limited. In other embodiments, one or more additional processing elements may be present in a given processor. Alternatively, one or more of processing elements 970, 980 may be an element other than a processor, such as an accelerator or a field programmable gate array. For example, additional processing element(s) may include additional processors(s) that are the same as a first processor 970, additional processor(s) that are heterogeneous or asymmetric to processor a first processor 970, accelerators (such as, e.g., graphics accelerators or digital signal processing (DSP) units), field programmable gate arrays, or any other processing element. There can be a variety of differences between the processing elements 970, 980 in terms of a spectrum of metrics of merit including architectural, micro architectural, thermal, power consumption characteristics, and the like. These differences may effectively manifest themselves as asymmetry and heterogeneity amongst the processing elements 970, 980. For at least one embodiment, the various processing elements 970, 980 may reside in the same die package.

The first processing element 970 may further include memory controller logic (MC) 972 and point-to-point (P-P) interfaces 976 and 978. Similarly, the second processing element 980 may include a MC 982 and P-P interfaces 986 and 988. As shown in FIG. 9, MC's 972 and 982 couple the processors to respective memories, namely a memory 932 and a memory 934, which may be portions of main memory locally attached to the respective processors. While the MC 972 and 982 is illustrated as integrated into the processing elements 970, 980, for alternative embodiments the MC logic may be discrete logic outside the processing elements 970, 980 rather than integrated therein.

The first processing element 970 and the second processing element 980 may be coupled to an I/O subsystem 990 via P-P interconnects 976 986, respectively. As shown in FIG. 9, the I/O subsystem 990 includes P-P interfaces 994 and 998. Furthermore, I/O subsystem 990 includes an interface 992 to couple I/O subsystem 990 with a high performance graphics engine 938. In one embodiment, bus 949 may be used to couple the graphics engine 938 to the I/O subsystem 990. Alternately, a point-to-point interconnect may couple these components.

In turn, I/O subsystem 990 may be coupled to a first bus 916 via an interface 996. In one embodiment, the first bus 916 may be a Peripheral Component Interconnect (PCI) bus, or a bus such as a PCI Express bus or another third generation I/O interconnect bus, although the scope of the embodiments are not so limited.

As shown in FIG. 9, various I/O devices 914 (e.g., biometric scanners, speakers, cameras, sensors) may be coupled to the first bus 916, along with a bus bridge 918 which may couple the first bus 916 to a second bus 920. In one embodiment, the second bus 920 may be a low pin count (LPC) bus. Various devices may be coupled to the second bus 920 including, for example, a keyboard/mouse 912, communication device(s) 926, and a data storage unit 919 such as a disk drive or other mass storage device which may include code 930, in one embodiment. The illustrated code 930 may implement the method 300 (FIG. 3), already discussed and the method 420 (FIG. 4B), already discussed, and may be similar to the code 805 (FIG. 8), already discussed. Further, an audio I/O 924 may be coupled to second bus 920 and a battery 910 may supply power to the computing system 900.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

ADDITIONAL NOTES AND EXAMPLES

Example 1 may include an apparatus to accommodate depth noise in SLAM (Simultaneous Localization and Mapping) comprising one or more substrates and logic coupled to the one or more substrates, wherein the logic includes one or more of configurable logic or fixed-functionality hardware logic, the logic coupled to the one or more substrates to receive correspondences and clusters for pose estimation, determine a dynamic centroid using 3-D features of a landmark, wherein the 3-D features of the landmark comprise a cluster, determine distance-error metrics using the dynamic centroid, a map point, and the cluster, compare the distance-error metrics with thresholds to remove depth noise affected 3-D features and landmarks when the distance-error metrics are larger than the thresholds, and send remaining 3-D features of the cluster to a pose estimation framework.

Example 2 may include the apparatus of example 1, wherein the distance-error metrics are collected across camera viewpoints of the landmark to form consensus.

Example 3 may include the apparatus of example 1, wherein the distance-error metrics comprise at least one of Euclidean distance, weighted distance, Manhattan distance or Mahalanobis distance.

Example 4 may include the apparatus of example 1, wherein the distance-error metrics comprises feature level metrics and cluster level metrics.

Example 5 may include the apparatus of example 4, wherein the feature level metrics comprise individual metrics for each 3-D feature based on distances between each 3-D feature and the dynamic centroid and distances between each 3-D feature and the map point.

Example 6 may include the apparatus of example 4, wherein the cluster level metrics comprise the average of each feature level metric and the distance between the dynamic centroid and the map point.

Example 7 may include the apparatus of example 4, wherein the logic coupled to the one or more substrates to compare the distance error metrics comprises logic to compare similar distance error metrics to a same threshold, wherein distances between the map point and the 3-D features and their average are compared against a first threshold, $\tau_{M,F}$, wherein distances between the centroid and the 3-D features and their average are compared against a second threshold, $\tau_{G,F}$, and wherein distances between the centroid and the map point are compared against a third threshold, $\tau_{M,G}$.

Example 8 may include the apparatus of example 7, wherein after the feature level metrics and the cluster level metrics are determined, the logic further to include logic to first cull aberrant clusters using the cluster level metrics and then for each of the remaining clusters to cull feature level observations using the feature level metrics, wherein only the 3-D features that remain are sent to the pose estimation framework.

Example 9 may include the apparatus of example 1, wherein when a feature is detected from another viewpoint, the logic further includes logic to recompute the geometric centroid.

Example 10 may include the apparatus of example 1, wherein 3-D features with marginal depth inaccuracies remain, wherein the logic further includes logic to refine marginal depth inaccuracies as part of the pose estimation framework.

Example 11 may include a method of accommodating depth noise in SLAM (Simultaneous Localization and Mapping) comprising receiving correspondences and clusters for pose estimation, determining a dynamic centroid using 3-D features of a landmark, wherein the 3-D features of the landmark comprise a cluster, determining distance-error metrics using the dynamic centroid, a map point, and the cluster, comparing the distance-error metrics with thresholds to remove depth noise affected 3-D features and landmarks when the distance-error metrics are larger than the thresholds, and sending remaining 3-D features of the cluster to a pose estimation framework.

Example 12 may include the method of example 11, wherein the distance-error metrics are collected across camera viewpoints of the landmark to form consensus.

Example 13 may include the method of example 11, wherein the distance-error metrics comprise at least one of Euclidean distance, weighted distance, Manhattan distance or Mahalanobis distance.

Example 14 may include the method of example 11, wherein distance-error metrics comprises feature level metrics and cluster level metrics.

Example 15 may include the method of example 14, wherein the feature level metrics comprise individual metrics for each 3-D feature based on distances between each 3-D feature and the dynamic centroid and distances between each 3-D feature and the map point.

Example 16 may include the method of example 14, wherein the cluster level metrics comprise the average of each feature level metric and the distance between the dynamic centroid and the map point.

Example 17 may include the method of example 11, wherein comparing the distance-error metrics comprises comparing similar distance-error metrics to a same threshold, wherein distances between the map point and the 3-D features and their average are compared against a first threshold, $\tau_{M,F}$, wherein distances between the centroid and the 3-D features and their average are compared against a second threshold, $\tau_{G,F}$, and wherein distances between the centroid and the map point are compared against a third threshold, $\tau_{M,G}$.

Example 18 may include the method of example 14, wherein after the feature level metrics and the cluster level metrics are determined, aberrant clusters are first culled using the cluster level metrics and then for each of the remaining clusters individual feature level observations are culled using the feature level metrics, wherein only the 3-D features that remain are sent to the pose estimation framework.

Example 19 may include the method of example 11, wherein when a feature is detected from another viewpoint, the geometric centroid is recomputed.

Example 20 may include the method of example 11, wherein 3-D features with marginal depth inaccuracies remain, wherein the marginal depth inaccuracies are refined as part of the pose estimation framework.

Example 21 may include at least one computer readable medium, comprising a set of instructions, which when executed by one or more computing devices, cause the one or more computing devices to receive correspondences and clusters for pose estimation, determine a dynamic centroid using 3-D features of a landmark, wherein the 3-D features of the landmark comprise a cluster, determine distance-error metrics using the dynamic centroid, a map point, and the cluster, compare the distance-error metrics with thresholds to remove depth noise affected 3-D features and landmarks when the distance-error metrics are larger than the thresholds, and send remaining 3-D features of the cluster to a pose estimation framework.

Example 22 may include the at least one computer readable medium of example 21, wherein the distance-error metrics are collected across camera viewpoints of the landmark to form consensus.

Example 23 may include the at least one computer readable medium of example 21, wherein the distance-error metrics comprise at least one of Euclidean distance, weighted distance, Manhattan distance or Mahalanobis distance.

Example 24 may include the at least one computer readable medium of example 21, wherein the distance-error metrics comprises feature level metrics and cluster level metrics.

Example 25 may include the at least one computer readable medium of example 24, wherein the feature level metrics comprise individual metrics for each 3-D feature based on distances between each 3-D feature and the dynamic centroid and distances between each 3-D feature and the map point.

Example 26 may include the at least one computer readable medium of example 24, wherein the cluster level metrics comprise the average of each feature level metric and the distance between the dynamic centroid and the map point.

Example 27 may include the at least one computer readable medium of example 21, wherein instructions to compare the distance error metrics further comprises instructions, which when executed by one or more computing devices, cause the one or more computing devices to: compare similar distance-error metrics to a same threshold, wherein distances between the map point and the 3-D features and their average are compared against a first threshold, $\tau_{M,F}$, wherein distances between the centroid and the 3-D features and their average are compared against a second threshold, $\tau_{G,F}$, and wherein distances between the centroid and the map point are compared against a third threshold, $\tau_{M,G}$.

Example 28 may include the at least one computer readable medium of example 24, wherein after the feature level metrics and the cluster level metrics are determined, the at least one computer readable medium further comprising instructions, which when executed by the one or more computing devices, cause the one or more computing devices to cull aberrant clusters using the cluster level metrics and then for each of the remaining clusters to cull individual feature level observations using the feature level metrics, wherein only the 3-D features that remain are sent to the pose estimation framework.

Example 29 may include the at least one computer readable medium of example 21, wherein when a feature is detected from another viewpoint, the geometric centroid is recomputed.

Example 30 may include the at least one computer readable medium of example 21, wherein 3-D features with marginal depth inaccuracies remain, wherein the marginal depth inaccuracies are refined as part of the pose estimation framework.

Example 31 may include a system for accommodating depth noise in SLAM (Simultaneous Localization and Mapping) comprising network interface circuitry to receive SLAM input data comprising 2-D feature points, 3-D feature points, depth data, landmarks, and images taken by a moving camera, a processor coupled to the network interface circuitry, one or more memory devices coupled to the processor, the one or more memory devices including instructions, which when executed by the processor, cause the system to receive correspondences and clusters for pose estimation, determine a dynamic centroid using 3-D features of a landmark, wherein the 3-D features of the landmark comprise a cluster, determine distance-error metrics using the dynamic centroid, a map point, and the cluster, compare the distance-error metrics with thresholds to remove depth noise affected 3-D features and landmarks when the distance-error metrics are larger than the thresholds, and send remaining 3-D features of the cluster to a pose estimation framework.

Example 32 may include the system of example 31, wherein the distance-error metrics are collected across camera viewpoints of the landmark to form consensus.

Example 33 may include the system of example 31, wherein the distance-error metrics comprise at least one of Euclidean distance, weighted distance, Manhattan distance or Mahalanobis distance.

Example 34 may include the system of example 31, wherein the distance-error metrics comprises feature level metrics and cluster level metrics.

Example 35 may include the system of example 34, wherein the feature level metrics comprise individual metrics for each 3-D feature based on distances between each 3-D feature and the dynamic centroid and distances between each 3-D feature and the map point.

Example 36 may include the system of example 34, wherein the cluster level metrics comprise the average of each feature level metric and the distance between the dynamic centroid and the map point.

Example 37 may include the system of example 31, wherein instructions to compare the distance error metrics further comprises instructions, which when executed by one or more computing devices, cause the one or more computing devices to: compare similar distance-error metrics to a same threshold, wherein distances between the map point and the 3-D features and their average are compared against a first threshold, $\tau_{M,F}$, wherein distances between the centroid and the 3-D features and their average are compared against a second threshold, $\tau_{G,F}$, and wherein distances between the centroid and the map point are compared against a third threshold, $\tau_{M,G}$.

Example 38 may include the system of example 34, wherein after the feature level metrics and the cluster level metrics are determined, the at least one computer readable medium further comprising instructions, which when executed by the one or more computing devices, cause the one or more computing devices to cull aberrant clusters using the cluster level metrics and then for each of the remaining clusters to cull individual feature level observations using the feature level metrics, wherein only the 3-D features that remain are sent to the pose estimation framework.

Example 39 may include the system of example 31, wherein when a feature is detected from another viewpoint, the geometric centroid is recomputed.

Example 40 may include the system of example 31, wherein 3-D features with marginal depth inaccuracies remain, wherein the marginal depth inaccuracies are refined as part of the pose estimation framework.

Example 41 may include an apparatus for accommodating depth noise in SLAM (Simultaneous Localization and Mapping) comprising means for receiving correspondences and clusters for pose estimation, means for determining a dynamic centroid using 3-D features of a landmark, wherein the 3-D features of the landmark comprise a cluster, means for determining distance-error metrics using the dynamic centroid, a map point, and the cluster, means for comparing the distance-error metrics with thresholds to remove depth noise affected 3-D features and landmarks when the distance-error metrics are larger than the thresholds, and means for sending remaining 3-D features of the cluster to a pose estimation framework.

Example 42 may include the apparatus of example 41, wherein the distance-error metrics are collected across camera viewpoints of the landmark to form consensus.

Example 43 may include the apparatus of example 41, wherein the distance-error metrics comprise at least one of Euclidean distance, weighted distance, Manhattan distance or Mahalanobis distance.

Example 44 may include the apparatus of example 41, wherein distance-error metrics comprises feature level metrics and cluster level metrics.

Example 45 may include the apparatus of example 44, wherein the feature level metrics comprise individual metrics for each 3-D feature based on distances between each 3-D feature and the dynamic centroid and distances between each 3-D feature and the map point.

Example 46 may include the apparatus of example 44, wherein the cluster level metrics comprise the average of each feature level metric and the distance between the dynamic centroid and the map point.

Example 47 may include the apparatus of example 41, wherein means for comparing the distance-error metrics comprises means for comparing similar distance-error metrics to a same threshold, wherein distances between the map point and the 3-D features and their average are compared against a first threshold, $\tau_{M,F}$, wherein distances between the centroid and the 3-D features and their average are compared against a second threshold, $\tau_{G,F}$, and wherein distances between the centroid and the map point are compared against a third threshold, $\tau_{M,G}$.

Example 48 may include the apparatus of example 44, wherein after the feature level metrics and the cluster level metrics are determined, aberrant clusters are first culled using the cluster level metrics and then for each of the remaining clusters individual feature level observations are culled using the feature level metrics, wherein only the 3-D features that remain are sent to the pose estimation framework.

Example 49 may include the apparatus of example 41, wherein when a feature is detected from another viewpoint, the geometric centroid is recomputed.

Example 50 may include the apparatus of example 41, wherein 3-D features with marginal depth inaccuracies remain, wherein the marginal depth inaccuracies are refined as part of the pose estimation framework.

Example 51 may include at least one computer readable medium comprising a set of instructions, which when executed by a computing system, cause the computing system to perform the method of any one of examples 11 to 20.

Example 52 may include an apparatus comprising means for performing the method of any one of examples 11 to 20.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An apparatus to accommodate depth noise in SLAM (Simultaneous Localization and Mapping) comprising:
   one or more substrates; and
   logic coupled to the one or more substrates, wherein the logic includes one or more of configurable logic or fixed-functionality hardware logic, the logic coupled to the one or more substrates to:
   receive correspondences and clusters for pose estimation;
   determine a dynamic centroid using 3-D features of a landmark, wherein the 3-D features of the landmark comprise a cluster;
   determine distance-error metrics using the dynamic centroid, a map point, and the cluster;
   compare the distance-error metrics with thresholds to remove depth noise affected 3-D features and landmarks when the distance-error metrics are larger than the thresholds; and
   send remaining 3-D features of the cluster to a pose estimation framework.

2. The apparatus of claim 1, wherein the distance-error metrics are collected across camera viewpoints of the landmark to form consensus.

3. The apparatus of claim 1, wherein the distance-error metrics comprise at least one of Euclidean distance, weighted distance, Manhattan distance or Mahalanobis distance.

4. The apparatus of claim 1, wherein the distance-error metrics comprises feature level metrics and cluster level metrics.

5. The apparatus of claim 4, wherein the feature level metrics comprise individual metrics for each 3-D feature based on distances between each 3-D feature and the dynamic centroid and distances between each 3-D feature and the map point.

6. The apparatus of claim 4, wherein the cluster level metrics comprise the average of each feature level metric and the distance between the dynamic centroid and the map point.

7. The apparatus of claim 4, wherein the logic coupled to the one or more substrates to compare the distance error metrics comprises logic to compare similar distance error metrics to a same threshold, wherein distances between the map point and the 3-D features and their average are compared against a first threshold, $\tau_{M,F}$, wherein distances between the centroid and the 3-D features and their average are compared against a second threshold, $\tau_{G,F}$, and wherein distances between the centroid and the map point are compared against a third threshold, $\tau_{M,G}$.

8. The apparatus of claim 7, wherein after the feature level metrics and the cluster level metrics are determined, the logic further to include logic to first cull aberrant clusters using the cluster level metrics and then for each of the remaining clusters to cull feature level observations using the feature level metrics, wherein only the 3-D features that remain are sent to the pose estimation framework.

9. The apparatus of claim 1, wherein when a feature is detected from another viewpoint, the logic further includes logic to recompute the geometric centroid.

10. The apparatus of claim 1, wherein 3-D features with marginal depth inaccuracies remain, wherein the logic further includes logic to refine marginal depth inaccuracies as part of the pose estimation framework.

11. A method for accommodating depth noise in SLAM (Simultaneous Localization and Mapping) comprising:
    receiving correspondences and clusters for pose estimation;
    determining a dynamic centroid using 3-D features of a landmark, wherein the 3-D features of the landmark comprise a cluster;
    determining distance-error metrics using the dynamic centroid, a map point, and the cluster;
    comparing the distance-error metrics with thresholds to remove depth noise affected 3-D features and landmarks when the distance-error metrics are larger than the thresholds; and
    sending remaining 3-D features of the cluster to a pose estimation framework.

12. The method of claim 11, wherein the distance-error metrics are collected across camera viewpoints of the landmark to form consensus.

13. The method of claim 11, wherein the distance-error metrics comprise at least one of Euclidean distance, weighted distance, Manhattan distance or Mahalanobis distance.

14. The method of claim 11, wherein distance-error metrics comprises feature level metrics and cluster level metrics.

15. The method of claim 11, wherein comparing the distance-error metrics comprises comparing similar distance-error metrics to a same threshold, wherein distances between the map point and the 3-D features and their average are compared against a first threshold, $\tau_{M,F}$, wherein distances between the centroid and the 3-D features and their average are compared against a second threshold, $\tau_{G,F}$, and wherein distances between the centroid and the map point are compared against a third threshold, $\tau_{M,G}$.

16. The method of claim 14, wherein after the feature level metrics and the cluster level metrics are determined, aberrant clusters are first culled using the cluster level metrics and then for each of the remaining clusters individual feature level observations are culled using the feature level metrics, wherein only the 3-D features that remain are sent to the pose estimation framework.

17. The method of claim 11, wherein when a feature is detected from another viewpoint, the geometric centroid is recomputed.

18. The method of claim 11, wherein 3-D features with marginal depth inaccuracies remain, wherein the marginal depth inaccuracies are refined as part of the pose estimation framework.

19. At least one non-transitory computer readable medium, comprising a set of instructions, which when executed by one or more computing devices, cause the one or more computing devices to:
receive correspondences and clusters for pose estimation;
determine a dynamic centroid using 3-D features of a landmark, wherein the 3-D features of the landmark comprise a cluster;
determine distance-error metrics using the dynamic centroid, a map point, and the cluster;
compare the distance-error metrics with thresholds to remove depth noise affected 3-D features and landmarks when the distance-error metrics are larger than the thresholds; and
send remaining 3-D features of the cluster to a pose estimation framework.

20. The at least one non-transitory computer readable medium of claim 19, wherein the distance-error metrics are collected across camera viewpoints of the landmark to form consensus.

21. The at least one non-transitory computer readable medium of claim 19, wherein the distance-error metrics comprises feature level metrics and cluster level metrics.

22. The at least one non-transitory computer readable medium of claim 21, wherein the feature level metrics comprise individual metrics for each 3-D feature based on distances between each 3-D feature and the dynamic centroid and distances between each 3-D feature and the map point.

23. The at least one non-transitory computer readable medium of claim 21, wherein the cluster level metrics comprise the average of each feature level metric and the distance between the dynamic centroid and the map point.

24. The at least one non-transitory computer readable medium of claim 21, wherein instructions to compare the distance error metrics further comprises instructions, which when executed by one or more computing devices, cause the one or more computing devices to: compare similar distance error metrics to a same threshold, wherein distances between the map point and the 3-D features and their average are compared against a first threshold, $\tau_{M,F}$, wherein distances between the centroid and the 3-D features and their average are compared against a second threshold, $\tau_{G,F}$, and wherein distances between the centroid and the map point are compared against a third threshold, $\tau_{M,G}$.

25. The at least one non-transitory computer readable medium of claim 24, wherein after the feature level metrics and the cluster level metrics are determined, the at least one computer readable medium further comprising instructions, which when executed by the one or more computing devices, cause the one or more computing devices to cull aberrant clusters using the cluster level metrics and then for each of the remaining clusters to cull individual feature level observations using the feature level metrics, wherein only the 3-D features that remain are sent to the pose estimation framework.

* * * * *